US006485550B2

(12) United States Patent
Hirose

(10) Patent No.: US 6,485,550 B2
(45) Date of Patent: Nov. 26, 2002

(54) SELF-SACRIFICE TYPE METAL CORROSION INHIBITOR AND A METAL CORROSION INHIBITING METHOD

(75) Inventor: Kunihiko Hirose, Matsuzaka (JP)

(73) Assignees: Toyographoile Ltd., Mie (JP); Institute of Technology Precision Electric Discharge Work's, Kanagawa (JP)

( * ) Notice: Subject to any disclaimer, the term of this patent is extended or adjusted under 35 U.S.C. 154(b) by 0 days.

(21) Appl. No.: 09/789,407

(22) Filed: Feb. 20, 2001

(65) Prior Publication Data

US 2001/0022149 A1 Sep. 20, 2001

(30) Foreign Application Priority Data

Feb. 17, 2000 (JP) ........................................ 2000-039171
Jan. 17, 2001 (JP) ........................................ 2001-008665

(51) Int. Cl.[7] .................................................. C09D 5/10
(52) U.S. Cl. ................................ 106/14.44; 106/14.21; 106/14.41; 427/388.1; 427/388.4
(58) Field of Search ........................... 106/14.44, 14.21, 106/14.41; 427/388.1, 388.4

(56) References Cited

U.S. PATENT DOCUMENTS

| | | | | | |
|---|---|---|---|---|---|
| 3,770,482 | A | * | 11/1973 | Millar et al. | ................. 427/470 |
| 4,381,334 | A | * | 4/1983 | Balk et al. | ................. 106/1.17 |
| 5,082,698 | A | * | 1/1992 | Anderson et al. | ............ 427/386 |
| 5,098,938 | A | * | 3/1992 | Savin | ........................... 523/220 |
| 5,330,850 | A | * | 7/1994 | Suzuki et al. | ................. 428/623 |
| 5,338,348 | A | * | 8/1994 | Savin | ....................... 106/14.05 |
| 5,397,638 | A | * | 3/1995 | Miki et al. | ................... 428/328 |
| 5,413,628 | A | * | 5/1995 | Savin | ....................... 106/14.05 |
| 5,753,316 | A | * | 5/1998 | Brent et al. | .................. 427/379 |
| 5,792,803 | A | * | 8/1998 | Savin | ........................... 523/219 |
| 5,859,095 | A | * | 1/1999 | Moyle et al. | ................ 523/402 |

FOREIGN PATENT DOCUMENTS

| | | | |
|---|---|---|---|
| JP | 57-82169 | * | 5/1989 |
| JP | 5-306454 | * | 11/1993 |
| WO | 0/32843 | * | 6/2000 |

* cited by examiner

Primary Examiner—Anthony J. Green
(74) Attorney, Agent, or Firm—Cooper & Dunham LLP; Donald S. Dowden

(57) ABSTRACT

A self-sacrifice type metal corrosion inhibitor is prepared by dispersing one or more kinds of metal powder having a greater ionization tendency than that of a metal to be treated and a water-insoluble thermoplastic resin powder in water containing a water-soluble anticorrosion agent, a surface-active agent and a thickener to from a treatment solution. The treatment solution is applied to the surface of the metal to be treated, which is heated to melt the thermoplastic resin powder and form a thermoplastic resin layer fixed to the surface of the metal. It forms a metal corrosion-inhibiting layer fixed to the surface through the thermoplastic resin, which acts as an adhesive layer.

5 Claims, No Drawings

SELF-SACRIFICE TYPE METAL CORROSION INHIBITOR AND A METAL CORROSION INHIBITING METHOD

FIELD OF THE INVENTION

The present invention relates to a self-sacrifice type metal corrosion inhibitor for the corrosion proof treatment of the surface of the metal such as iron or iron alloy and a metal corrosion inhibiting method using said self-sacrifice type metal corrosion inhibitor.

DESCRIPTION OF THE PRIOR ART

Hitherto, a metal corrosion inhibitor comprising a metal powder having a greater ionization tendency than that of a metal to be treated such as zinc powder or aluminum powder in a case where said metal to be treated is iron or iron alloy, chromium (VI) source such as chromate and the like, pH adjusting agent such as metal oxide, metal hydroxide and the like, reducing organic compound such as low molecular oxohydroxy ether and the like, and water soluble solvent has been provided.

Said traditional metal corrosion inhibitor is adhered to the surface of a metal to be treated and chromium (VI) from said chromium (VI) source may be reduced by said reducing organic compound to chromium (III) to sedimentate on the surface of said metal to be treated by heating and said metal powder is adhered to, and fixed on the surface of said metal to be treated through said chromium (III) layer as an adhesive layer to form a metal corrosion inhibiting layer.

Hitherto, zinc-electro plating, zinc-mechanical plating and zinc-mechanical galvanized, zinc-melting plating and the like have been also used for the metal corrosion inhibiting treatment.

Said traditional metal corrosion inhibitor contains chromium (VI) source and in said zinc-electro plating, zinc-mechanical plating and zinc-mechanical galvanized, zinc-melting plating and the like also chromium (VI) is used to improve the metal corrosion inhibiting property. Nevertheless, said chromium (VI) is poisonous and it becomes difficult to use said chromium (VI) considering environmental contamination. Further said zinc-mechanical plating and zinc-mechanical galvanized has a problem of noise so that the advert of a self-sacrifice type metal corrosion inhibitor has been desired. Said self-sacrifice type metal corrosion inhibitor may contain no poisonous component and cause no public nuisance and no noise while said self-sacrifice type metal corrosion inhibitor has a metal corrosion inhibiting property equal to the traditional metal corrosion inhibitor containing chromium (VI) source.

SUMMARY OF THE INVENTION

Accordingly, an object of the present invention is to provide a self-sacrifice type metal corrosion inhibitor causing no public nuisance and no noise.

Another object of the present invention is to provide a self-sacrifice type metal corrosion inhibitor having a metal corrosion inhibiting property equal to the traditional metal corrosion inhibitor containing chromium (VI).

Briefly, said objects of the present invention can be attained by a self-sacrifice type metal corrosion inhibitor comprising;

one or more kind(s) of metal powder having a greater ionization tendency than that of a metal to be treated, water insoluble thermoplastic resin powder, water soluble anticorrosion agent, surface active agent, thickener and water; and a metal corrosion inhibiting method comprising; preparing a treatment solution by dispersing said metal powder having a greater ionization tendency than that of said metal to be treated and said water insoluble thermoplastic resin powder in water containing said water soluble anticorrosion agent, said surface active agent and said thickener, adhering said treatment solution to the surface of said metal to be treated, heating said metal to be treated to melt said thermoplastic resin powder and form a thermoplastic resin layer fixed on the surface of said metal to be treated, and forming a metal corrosion inhibiting layer on the surface of said metal to be treated by fixing said metal powder on the surface of said metal to be treated through said thermoplastic resin layer as an adhesive layer; and further a metal corrosion inhibiting method comprising; a treatment solution by dispersing said metal powder having a greater ionization tendency than that of said metal to be treated and said water insoluble thermoplastic resin powder in water containing said water soluble anticorrosion agent, said surface active agent and said thickener, adhering said treatment solution to the surface of said metal to be treated, heating said metal to be treated to melt said thermoplastic resin powder and form a thermoplastic resin layer fixed on the surface of said metal to be treated, and forming a metal corrosion inhibiting layer on the surface of said metal to be treated by fixing said metal powder on the surface of said metal to be treated through said thermoplastic resin layer as an adhesive layer; and further treating with a mixture of polymer and/or oligomer and $Na_2O:nSiO_2$ (n=3 or 4) as a self-restoring agent for the self-sacrifice type corrosion inhibiting property of said metal corrosion inhibiting layer wherein said polymer and/or oligomer is(are) one or more polymer or oligomer selected from a group consisting of poly (meth)acrylic acid, copolymer of (meth)acrylic acid and other vinyl monomer which can be copolymerized with (meth) acrylic acid, (meth)acrylic acid oligomer, and oligomer consisting of (meth)acrylic acid and other vinyl monomer which can be copolymerized with (meth)acrylic acid.

In a case where said metal to be treated is iron or iron alloy, zinc powder or aluminum powder or zinc-aluminum alloy powder is preferably used.

In said metal corrosion inhibitor of the present invention, said metal powder and said water insoluble thermoplastic resin powder are stably dispersed in water containing said water soluble anticorrosion agent, said surface active agent and said thickener.

When said treating solution is adhered on the surface of said metal to be treated and heated, said water insoluble thermoplastic resin is melted to adhere the surface of said metal to be treated and a metal corrosion inhibiting layer is formed. In said metal corrosion inhibiting layer, said thermoplastic resin powder maintains powder form since said thermoplastic resin powder is insoluble in water, the resulting thermoplastic resin layer on the surface of said metal to be treated has a porous structure. Accordingly said metal corrosion inhibiting layer consisting of said metal layer which is fixed on the surface of said metal to be treated by said thermoplastic resin layer also has a porous structure, and as a result said metal corrosion inhibiting layer becomes an electroconductive layer having a low electric resistance and a desirable electric resistance on the surface of said metal to be treated is guaranteed.

Further when said treated metal is further treated with a mixture of polymer and/or oligomer and $Na_2O:nSiO_2$ (n=3 or 4) as a self-restoring agent for the self-sacrifice type corrosion inhibiting property of said metal corrosion inhibiting layer wherein said polymer and/or oligomer is(are) one or more polymer or oligomer selected from a group consisting of poly (meth)acrylic acid, copolymer of (meth) acrylic acid and other vinyl monomer which can be copolymerized with (meth)acrylic acid, (meth)acrylic acid oligomer, and oligomer consisting of (meth)acrylic acid and other vinyl monomer which can be copolymerized with (meth)acrylic acid, to form an organo silicate compound layer on said metal corrosion inhibiting layer, a self-restoring property equal to or higher than that of zinc-chromate treatment layer is given to said metal corrosion inhibiting layer.

Said treatment solution consisting of only nonpoisonous components contains no poisonous component such as chromium (VI) source and the like.

DETAILED DESCRIPTION

[Metal powder]

Metal powder used in the present invention consists of a metal having a greater ionization tendency than that of a metal to be treated and in a case where said metal to be treated is iron or iron alloy, said metal powder may be zinc powder, aluminum powder, zinc-aluminum alloy powder and the like. The purity of said metal powder is preferably higher than 99.0% by weight, more preferably higher than 99.5% by weight and said metal powder has preferably powder form or flake form. In the case of zinc powder having flake form, the thickness is preferably less than 3 $\mu$m, more preferably less than 2 $\mu$m and the diameter is preferably less than 10 $\mu$m, more preferably less than 7 $\mu$m, and in the case of aluminum powder having flake form, the thickness is preferably less than 1 $\mu$m, more preferably less than 0.5 $\mu$m and the diameter is preferably less than 10 $\mu$m, more preferably less than 7 $\mu$m. The thinner is the better in each case where said metal powder has flake form.

Silver powder or silver flake, gold powder or gold flake, nickel powder or nickel flake, titanium powder or titanium flake, copper powder or copper flake and the like may be used instead of said metal powder or alloy powder or partially added to said metal powder or alloy powder.

Desirably, the surface of said metal powder may be treated with a treatment agent such as higher fatty acid, higher alcohol, wax having a high melting point, paraffine having a high melting point, antioxidant and the like. To treat the surface of said metal powder with said treatment agent, said metal powder may be dipped in a solution of said treatment agent using kerosine, mineral spirit, mineral terpin and the like as a solvent or said solution may be sprayed to said metal powder.

It is preferable to use zinc powder and aluminum powder together comparing the case where zinc powder or aluminum powder is singly used since when the surface of said metal to be treated is treated with zinc powder and aluminum powder together, zinc powder having a smaller ionization tendency and a higher specific gravity than aluminum may be migrated to the lower side of the treatment layer and aluminum may be migrated to the upper side of the treatment layer and as a result, a desirable self-sacrifice type metal corrosion inhibiting property is given to said surface of said treated metal.

Said metal powder may give a low electric resistance to said treatment layer and guarantee the preferable electroconductivity of the surface of said treated metal and said metal powder may be added in said treatment solution commonly in an amount between 1 to 75% by weight, desirably 5 to 40% by weight. In a case where the self-sacrifice type metal corrosion inhibiting property is very important, both zinc powder and aluminum powder are desirably used. In this case, the adding amount of zinc powder is desirably settled to be more than two times as the adding amount of aluminum, and the adding amount of zinc powder may be settled to be 1 to 30% by weight, desirably 5 to 25% by weight, and the adding amount of aluminum powder may be settled to be 1 to 25% by weight, desirably 2 to 15% by weight.

When silver, gold, nickel, titanium or copper is used as a material of said metal powder, the electric resistance of the resulting treatment layer may be much lower and the electroconductivity of said treatment layer may be much higher so that said treatment solution can be used in the electromagnetic wave shield treatment, photocatalyst, and the like besides the metal corrosion inhibiting treatment.

[Water insoluble thermoplastic resin]

Water insoluble thermoplastic resin is used to adhere said metal powder to the surface of said metal to be treated and to adhere said metal powder together in the present invention. When water-soluble thermoplastic resin is used as an adhesive agent, said thermoplastic resin dissolves in water so that the surface of said metal to be treated may be wholly covered with said thermoplastic resin layer and non-electroconductive film of said thermoplastic resin layer may be formed between said metal powders and the surface of said metal to be treated, which inhibits the electroconductivity of said treatment layer and the self sacrifice type metal corrosion inhibiting property may not be produced sufficiently.

In the present invention, water insoluble thermoplastic resin powder is used not to inhibit the electroconductive ity of said treatment layer. The smaller particle size of said thermoplastic resin powder may result in the smaller using amount of said thermoplastic resin powder and adhesion of said metal powder together and between said metal powder and the surface of said metal to be treated may become more partial, resulting in an excellent electroconductivity and said treatment layer having self-sacrifice type metal corrosion inhibiting property may become finer and stronger.

Said water insoluble thermoplastic resin powder may be such as thermoplastic epoxy resin, polyethylene, polyvinylchloride, nylon resin such as nylon 6, nylon 66, nylon12, nylon 612, nylon 12 copolymer and the like, fluoro carbon resin such as PTFE, PFA, FED, teflon derivative and the like, epoxy-polyester copolymer, polyolefin thermoplastic elastomer such as TPE and the like, polycarbonate resin, polyacetal resin, melamine resin and the like.

Said water insoluble thermoplastic resin has been traditionally used in the powder coating process. The diameter of said thermoplastic resin powder is preferably less than 40 $\mu$m, more preferably less than 20 $\mu$m. The smaller diameter of said thermoplastic resin powder is better for the present invention. The using amount of said water insoluble thermoplastic resin powder may be 1 to 35% by weight, desirably 1 to 10% by weight.

[Water soluble anticorrosion agent]

Said water soluble anticorrosion agent used in the present invention has been traditionally used in cooling water for the radiator, the engine, and the like of the automobile and said water soluble anticorrosion agent is used for anticorrosion treatment of steel, cast iron, copper, copper alloy, solder, zinc, aluminum and the like. Many kinds of water soluble anticorrosion agent passing the anticorrosion ability test (metal corrosion test) JAOS-7014 can be used in the present invention.

Typically said water soluble anticorrosion agent may comprise an amide of lower fatty acid such as diethanol amide of hippuric acid, diethyl amide of hippuric acid, diethanol amide of saccinic acid amide and the like, and nitrite such as dicyclohexylamine nitrite, cyclohexyl amine nitrite, diethanol amine nitrite and the like. The adding amount of said water soluble anticorrosion agent may be commonly 0.1 to 10% by weight, desirably 0.5 to 3% by weight.

[Surface active agent]

In the metal corrosion inhibitor of the present invention, a surface active agent is used to disperse said metal powder and said water insoluble thermoplastic resin powder in water stably.

Said surface active agent may be alkylaryl ether type nonionic surface active agents such as polyoxyethyleneo nylphenyl ether, polyoxyethyleneoctylphenyl ether and the like, alkyl ether type nonionic surface active agents such as polyoxyethylenebutyl ether, polyoxyethyleneoctylether, polyoxyethylenelauryl ether, polyoxyethyleneoleyl ether, polyoxyethylenestearyl ether, alkyl acetate type nonionic surface active agents such as polyoxyethylenelaurate, polyoxyethyleneo leate, polyoxyethylenestearate and the like, and ethylene oxide-propylene oxide block copolymer type nonionic surface active agents such as polypropylene glycol-polyethylene glycol ether and the like.

It is preferable to select a surface active agent containing no aryl group considering environmental hormone contamination. Further, it is preferable to select a surface active agent having H.L.B (Hydrophile-Lipophile Balance) value 7 to 18 more desirably 11 to 14. The adding amount of said surface active agent may be commonly 0.05 to 8% by weight, desirably 0.1 to 5% by weight.

[Thickener]

Thickener should be added in said metal corrosion inhibitor of the present invention to ensure enough thickness of the coating layer of said treatment solution on the surface of said metal to be treated. Said thickener, used for this invention, is a water-soluble thickener comprising methyl cellulose, carboxymethylcellulose, hydroxymethylcellulose, ethyl cellulose, carboxymethylcellulose, hydroxyethylcellulose, poly(vinyl alcohol), starch, nonionic starch, pectin, guar gum, tamarind gum, locast bean gum, galactomannan, carrageenan, agar and the like. Further said carboxymethylcellulose, hydroxymethylcellulose, and hydroxyethylcellulose are more preferable as a thickener. The adding amount of said thickener may be commonly 0.05 to 5% by weight, desirably 0.1 to 1% by weight.

[Water]

Water used to prepare said treatment solution of said metal corrosion inhibitor in the present invention may be such as distilled water, deionized water, further boiled city water and the like.

[Sterilizer]

Since said treatment solution in said self-sacrifice type metal corrosion inhibitor of the present invention is nearly neutral, it is desirable to add a sterilizer to inhibit propagation of many kinds of microorganism such as bacteria, fungus, yeast, duckweed, and the like in the case of a long time storage. Said sterilizer to be selected has preferable compatibility with other components used in said treatment solution.

Said sterilizer used in the present invention may be isothiazoline and its derivative, organonitrogen-sulfur compound, organonitorogen compound, organonitrogen halogen compound, chlorohexidine salt, mixture of organo-nitrogen compound and organo sulfur halogen compound, mixture of organonitrogen compound and organonitrogen sulfur compound and the like. Desirable sterilizer may be isothiazolin and its derivative and chlorohexydine salt. Adding amount of said sterilizer may be commonly 0.01 to 5% by weight, desirably 0.01 to 1% by weight.

[Aqueous organic solvent]

It is preferable to add on aqueous organic solvent to improve dispersing stability together with said anticorrosion agent and said surface active agent in said treatment solution of said corrosion inhibitor of the present invention. Said aqueous organic solvent may be 1-propanol, 2-propanol, primary butanol, secondary butanol, tertiary butanol, ethyleneglycol, diethyleneglycol, propyleneglycol, dipropyleneglycol, glycerol, methylcellosolve, ethyllcellosolve, butylcellosolve, methylcarbitol, ethylcarbitol, butylcarbitol, butyleneglycol, 2-ethyl-1,3-hexanediol, neopentylglycol, 1,5-pentanediol, 2,3-dimethyl-2,2-butanediol, and ethyleneglycol-mono-t-butyl ether, diacetone alcohol and the like. Further, said glycerol, ethyleneglycol, diethyleneglycol, propyleneglycol, butyleneglycol, dipropyleneglycol, 2-ethyl-1,3-hexanediol, and 1,5-pentanediol are more desirable as an aqueous organic solvent. Adding amount of said aqueous organic solvent may be commonly 3 to 40% by weight, desirably 8 to 35% by weight.

[Treatment]

Said treatment solution of said corrosion inhibitor may be prepared by mixing said metal powder, said surface active agent, said water insoluble thermoplastic resin powder, said thickener and water, and desirably said aqueous organic solvent, said anticorrosion agent, and said sterilizer and stirring enough to disperse said metal powder in said treatment solution and the viscosity of said treatment solution is commonly adjusted 40±5 sec by Iwata Ford cup #4. To treat the surface of said metal to be treated, first the surface of said metal is polished by shot blast, sand blast and the like and then desirably washed by an organic solvent such as n-hexane, xylene, methylethyl ketone, acetone, and the like followed by drying.

After that, said treatment solution is coated on the surface of said metal by dipping, spraying, roll coater, curtain flow coater, rotating blush coater, electrostatic coating and the like. After coating, said metal is kept at room temperature if necessary with blowing against said metal to dry and heat at a temperature between 150 to 160° C. for at least 10 minutes for predrying and then at a temperature between 230 to 240° C. for at least 10 minutes for main drying.

A self-sacrifice type metal corrosion inhibiting layer is formed on the surface of said metal by said treatment.

If desirable, paint may be further coated on said corrosion inhibiting layer. Further, aqueous paint can be prepared by adding inorganic pigment instead of said metal powder when said treatment solution is prepared and said aqueous paint can be used for coating on said corrosion inhibiting layer instead of common paint.

[Self-restoring treatment]

On said corrosion inhibiting layer, self-restoring treatment by using a self-restoring agent having self-sacrifice type corrosion inhibiting property may be desirably effected. Mixture, which is used for said self-restoring agent, comprises $Na_2O:nSiO_2$ (n=3 or 4) and polymer and/or oligomer which is one or more polymer and/or oligomer selected from the group consisting of poly acrylic and/or methacrylic acid (hereinafter referred to as (meth)acrylic acid), copolymer of (meth)acrylic acid and other vinyl monomer which can be copolymerized with (meth)acrylic acid, (meth)acrylic acid oligomer, and oligomer consisting of (meth)acrylic acid and other vinyl monomer which can be copolymerized with (meth)acrylic acid As said other vinyl monomer which can be copolymerized with (meth)acrylic acid, one or more vinyl monomer can be used, wherein said one or more vinyl monomer is(are) one or more vinyl monomer comprising methyl (meth) acrylate, ethyl (meth)acrylate, n-propyl (meth)acrylate, isopropyl (meth)acrylate, n-butyl (meth)acrylate, 2-ethylhexyl (meth) acrylate, 2-hydroxyethyl (meth) acrylate, 2-hydroxypropyl (meth)acrylate, and diethylaminoethyl (meth)acrylate and the like. One or more kinds of said self-restoring agents may be used together.

Said self-restoring agent may be added in an amount of 0.1 to 20% by weight, desirably 1 to 5% by weight as a resin component of said polymer, and/or said copolymer and/or said oligomer, and $Na_2O:nSiO_2$ may be added in an amount of 20 to 45% by weight, desirably 25 to 35% by weight as $SiO_2$.

By said self-restoring treatment, self-restoring property equal to or higher than that of zinc-chromate treatment layer can be given on said metal corrosion inhibiting layer.

[EXAMPLE 1]

Components given below are well stirred to mix together.

| | ※ p/w = parts by weight |
| --- | --- |
| Aluminum paste *1 | 1.0 p/w |
| zinc powder *2 | 10.0 p/w |
| thermoplastic epoxy resin powder *3 | 10.0 p/w |
| Polyoxyethyleneoctylalcohol ether *4 | 2.0 p/w |
| Diethylene glycol | 20.0 p/w |
| Ethylene glycol | 10.0 p/w |
| Sterilizer *5 | 0.2 p/w |
| Anticorrosion agent *6 | 10.0 p/w |
| Ion exchange water | 32.7 p/w |
| Hydroxyethylcellulose | 0.38 p/w |

*1 Aluminum powder (thickness: 0.5 μm, diameter: 10.0 μm) is dispersed in a mineral spirit solution containing 10% by weight of stearyl alcohol and well stirred and then said aluminum powder is collected by condensation filtration. After drying, 67.5% by weight residue remains in the resulting paste.
*2 Zinc powder is zinc dust having a flake shape manufactured by the atomizing method and treated with higher alcohol. Said zinc powder has a size wherein thickness is 1.0 μm and length 0.5~10 μm.
*3 Thermoplastic epoxy resin powder is manufactured by freeze crushing of novolac type epoxy cresol resin. Particle size is about 20 to 30 μm.
*4 H.L.B of polyoxyethyleneoctylalcohol is 12.5.
*5 Isothiazolin compound (produced by SAN-AI OIL CO., LTD.) is used as a sterilizer.
*6 A water soluble anticorrosion agent (manufactured by CHELEST Co.) used for cooling water of the radiator of an automobile, an engine, and the like.

Preparation

Said aluminum paste, said zinc powder, said thermoplastic epoxy resin powder, polyoxyethylene octylalcohol ether, diethylene glycol, ethylene glycol, said sterilizer, and said anticorrosion agent are added to ion exchange water and stirred well for mixing. Further hydroxyethylcellulose is added and the resulting dispersing solution is stirred for 24 hours. Said dispersing solution is filtered by the filter having 100 mesh pores to prepare the treatment solution A. The viscosity of said treatment solution A is about 40 sec by Iwata Ford cup #4.

[EXAMPLE 2]

Components given below are well stirred to mix together in the same way as EXAMPLE 1 in order to obtain dispersing solution.

| | ※ p/w = parts by weight |
| --- | --- |
| Aluminum paste *7 | 4.0 p/w |
| Zinc powder (same as EXAMPLE 1) | 13.0 p/w |
| Nylon powder *8 | 4.0 p/w |
| Polyoxyethylenestearylalcohol ether *9 | 1.0 p/w |
| Dietylene glycol | 10.0 p/w |
| Propylene glycol | 8.0 p/w |
| Germicide (same as EXAMPLE 1) | 0.1 p/w |
| Rust inhibitor (same as EXAMPLE 1) | 6.0 p/w |
| Ion exchange water | 43.9 p/w |
| Hydroxyethylcellulose | 0.4 p/w |

*7 Aluminum powder (thickness: 0.25 μm, diameter: less than 7.0 μm) is dispersed in a mineral terpin solution containing 10% by weight of higher alcohol comprising mainly stearyl alcohol and well stirred and then said aluminum powder is collected by condensation filtration. After drying, 65% by weight of residue remains in the resulting paste.
*8 Nylon powder is nylon 12: the average diameter is 5 μm.
*9 H.L.B. of polyoxyethylenestearylalcohol ether is 12.3.

Said dispersing solution is filtered by the filter having 100 mesh pores to prepare the treatment solution B. The viscosity of said treatment solution B is about 40 sec by Iwata Ford cup #4.

[EXAMPLE 3]

Components given below are well stirred to mix together in the same way as EXAMPLE 1 in order to obtain a dispersing solution.

| | ※ p/w = parts by weight |
| --- | --- |
| Aluminum paste (same as EXAMPLE 2) | 6.0 p/w |
| Zinc powder (same as EXAMPLE 1) | 8.0 p/w |
| Nylon powder *10 | 15.0 p/w |
| Polyoxyethylenestearylalcohol ether | 1.2 p/w |
| Diethylene glycol | 17.7 p/w |
| Germicide (same as EXAMPLE 1) | 0.1 p/w |
| Rust inhibitor (same as EXAMPLE 1) | 2.0 p/w |
| Ion exchange water | 50.0 p/w |
| Hydroxyethylcellulose | 0.38 p/w |

*10 Nylon powder is nylon 12: the average diameter is 10 μm.

Said dispersing solution is filtered by the filter having 100 mesh pores to prepare the treatment solution C. The viscosity of said treatment solution C is about 38 sec by Iwata Ford cup #4.

[EXAMPLE 4]

Components given below are well stirred to mix together in the same way as EXAMPLE 1 in order to obtain a dispersing solution.

| | ※ p/w = parts by weight |
|---|---|
| Zinc powder (same as EXAMPLE 1) | 2.0 p/w |
| Black pigment *[11] | 5.0 p/w |
| Nylon powder (same as EXAMPLE 3) | 15.0 p/w |
| Fluororesin *[12] | 2.0 p/w |
| Polyoxyethylenestearylalcohol ether | 0.4 p/w |
| Diethylene glycol | 25.5 p/w |
| Germicide (same as EXAMPLE 1) | 0.1 p/w |
| Ion exchange water | 50.0 p/w |
| Hydroxyethylcellulose | 0.4 p/w |

*[11] Black pigment, which has the chemical composition of $(Cu, Fe, Mn)(Fe, Mn, Al)_2$ never correspond to the dangerous substance defined by the United Nations.
*[12] Fluororesin is low molecular weight PTFE, manufactured by Mitsui DU Pont-MITSUI FLUOROCHEMICAL COMPANY, LTD.; the average diameter is about 3 μm.

Said dispersing solution is filtered by the filter having 100 mesh pores to prepare the treatment solution D. The viscosity of said treatment solution D is about 36 sec by Iwata Ford cup #4.

[EXAMPLE 5]

Preparation of self-restoring agent [1]

The self-restoring agent [1] is prepared by stirring and mixing components given below.

| | ※ p/w = parts by weight |
|---|---|
| $Na_2O:nSiO_2$ (n = 4) | 75 p/w |
| Copolymer *[1] | 10 p/w |
| Water | 5 p/w |
| Butylcellosolve | 10 p/w |

*[1] Copolymer, which has a ratio of weight consisting of acrylic acid: 2-ethylhexyl acrylate = 5:1, is dissolved 45% by weight in ethanol.

[EXAMPLE 6]

Preparation of self-restoring agent [2]

The self-restoring agent [2] is prepared by stirring and mixing components given below.

| | ※ p/w = parts by weight |
|---|---|
| $Na_2O:nSiO_2$ (n = 3) | 70 p/w |
| Copolymer *[2] | 10 p/w |
| Water | 10 p/w |
| Methanol | 10 p/w |

*[2] Copolymer, which has a ratio of weight consisting of acrylic acid: dimethylaminoethyl methacrylate = 5:3, is dissolved 45% by weight in methanol.

[Test]

1. Materials
   (1) Steel panel: SS-41 steel panel (50×100×0.5 mm) was used for this test. Said steel panel was washed with n-hexane and after drying, the surface of said steel panel was polished by shot blast followed by washing with n-hexane and then ether and then dried.
   (2) Screw: a screw (length 75 mm, diameter 2 mm, head 8 mm, screw part 50 mm) was used. Said screw was washed with n-hexane and after drying the surface of said screw was polished by shot blast followed by washing with n-hexane and then dried.

2. Coating and heat treating
   (1) Steel panel
   Said treatment solutions A, B, C, D were respectively coated on the surfaces of said steel panel samples adjusting such that the thickness of the film becomes 15 to 17 μm after drying. After coating, said steel panel samples were respectively dried by air for 1 minute followed by pre drying at 150 to 160° C. for 10 minutes and main drying at 240° C. for 10 minutes.
   (2) Screw
   Each screw sample was dipped in each treatment solution A, B, C, D and after dipping, each screw sample was dehydrated by a dehydrator (cage diameter: 200 mm, depth 200 mm, rotation speed: 400 rpm, alternative rotation normal rotation 5 sec, reverse rotation 5 sec), and then dried by air for 1 minute followed by pre drying at 150 to 160° C. for 10 minutes and main drying at 240° C. for 10 minutes, Said treatment was repeated twice.

[Results of Test]

1. Appearance
   Steel panel
   (1) coating film of each steel panel sample was optically observed
   Test piece treated with the treatment solution A;
   A beautiful silver-gray colored coating film was formed but the surface of said coating film was uneven.
   Test piece treated with the treatment solution B;
   A beautiful silver-gray colored coating film was formed and the surface of said coating film was even and smooth.
   Test piece treated with the treatment solution C;
   A beautiful silver colored coating film was formed and the surface of said coating film was even and smooth.
   Test piece treated with the treatment solution D;
   A beautiful black colored coating film was formed and the surface of said coating film was even and had eubricity.
2. Adhesion test of coating film
   (1) Test method
   a) Steel panel
   Each steel panel sample treated with said treatment solution A, B, C, D was tested by a cross-cut test.
   b) Screw
   The head of each screw sample treated with said treatment solution A, B, C, D was strongly rubbed three times by finger to check any adhering film piece on a finger.
   (2) Results
   Results are shown in Table 1.

TABLE 1

| | treatment solution | | | |
|---|---|---|---|---|
| test items | A | B | C | D |
| cross-cut test, steel panel | 100/100* | 100/100* | 100/100* | 100/100* |
| Adhesion test of coating film, screw** | ○ | ○ | ○ | ○ |

*100/100, No coating film was exfoliated by cellophane adhesive tape.
**No coating film piece remained on one's finger.

Referring to Table 1, it is clear that the coating film (metal corrosion inhibiting layer) on each steel panel sample and the screw sample treated with said treatment solutions A, B, C, D had excellent adhesion.

3. Salt spray test
   Each steel panel sample and the screw treated with said treatment solution A, B, C, D were tested by a salt spray test according to JIS-2-23717. In the case of steel panel sample, each coating film was cross-cut and 5 samples of screw were tested in each group.

A zinc-electro plated steel panel sample was used as comparison. An unichromate coating film having a thickness 16 μm was formed on the surface of said steel panel sample. A screw sample was also treated with unichromate treatment and the thickness of the coating film covering the head of said screw sample was 13.5 μm.

TABLE 2

| treatment solution | | A | B | C | D | comparison |
|---|---|---|---|---|---|---|
| salt spray test | 24 steel panel | ○ | ○ | ○ | X1) | ○ |
| | screw | ○ | ○ | ○ | ○ | ○ |
| | 96 steel panel | X1) | ○ | X1) | — | ○ |
| | screw | Δ1) | ○ | ○ | Δ2) | ○ |
| | 504 steel panel | — | ○ | — | — | X2) |
| | screw | Δ2) | ○ | ○ | — | Δ2) |
| | 984 steel panel | — | ○ | — | — | X3) |
| | screw | — | ○ | Δ2) | — | — |
| | 2016 steel panel | — | ○ | — | — | — |
| | screw | — | ○ | — | — | — |

Appraisal
○: no change
Δ1): 1 screw sample out of 5 screw samples rusted
Δ2): 3 screw samples out of 5 screw samples rusted
X1) cross-cut part of the surface rusted
X2) A few parts of the surface excepting cross-cut parts rusted
X3) more than ⅔ of the surface excepting cross-cut parts rusted.

Referring to Table 2, it is clear that each sample treated with said treatment solutions shows an excellent corrosion inhibiting property, especially the sample treated with the treatment solution B shows an excellent self surface corrosion inhibiting property comparing with a traditional zinc plated sample. Further said treatment solution A, B, C, D can be respectively used as aqueous paint.

4. Weathering test

Steel panel samples treated with said treatment solution A, B, C, D respectively were placed at 45° facing south at Jimokuji-cho, Ama-gun, Aichi-prefecture for 30 days from Sep. 10, 1999. The results are shown in Table 3.

TABLE 3

| | treatment solution | | | |
|---|---|---|---|---|
| test items | A | B | C | D |
| weatherability test (steel panel) | ○ | ○ | ○ | ○ |

Appraisal ○: no change

Referring to Table 3, it is clear that each sample treated with said treatment solutions A, B, C, D has an excellent weatherability.

[Self-restoring treatment test]

Said steel panel samples treated with said treatment solution A in [Test] above described were further dipped respectively in the self-restoring solution [1] or the self-restoring solution [2] and after dipping, each sample was dried by air followed by drying with heating at 100° C. for 15 minutes.

The resulting coating film formed on the surface of each sample was cross-cut and each sample was dipped in 5% by weight a solution of salt and cross-cut parts of each sample were checked.

The results of this test were described below.

Self-restoring solution
Self-restoring solution [1]:
  No rusting for 80 days.
Self-restoring solution [2]:
  One point rusting at cross-cut parts after 80 days.
Zinc-chromate treatment
  One point rusting at cross-cut parts after 75 days.

Referring to the above described results, it is clear that treatment films of samples treated with self resulting solution [1] and [2] have self-restoring property equal to or higher than that of the zinc-chromate treatment film.

As above described, the metal corrosion inhibitor of the present invention and treatment film formed by the treatment with said metal corrosion inhibitor have absolutely no contaminated materials and no component producing contaminated materials after said metal corrosion inhibitor is abandoned.

Accordingly the metal corrosion inhibiting method using said metal corrosion inhibitor of the present invention is a treating method which causes no public nuisance and saves resources and energy and further the treatment layer of said metal corrosion inhibitor has a higher self-sacrifice corrosion inhibiting property than that of zinc-electro plating, zinc-mechanical plating and zinc-mechanical galvanized, zinc-melting and the like and further and the metal corrosion inhibitor of the present inhibitor is useful as aqueous paint.

What is claimed is:

1. A metal corrosion inhibitor having self-sacrifice action comprising:
    at least one metal powder having a greater ionization tendency than that of a metal to be treated, water insoluble thermoplastic resin powder, water soluble anticorrosion agent, surface active agent, thickener, and water.

2. A metal corrosion inhibitor in accordance with claim 1, wherein said metal to be treated comprises iron or iron alloy and said metal powder comprises zinc powder, aluminum powder or zinc-aluminum alloy powder.

3. A metal corrosion inhibiting method comprising:
    preparing a treatment solution by dispersing at least one metal powder having a greater ionization tendency than that of a metal to be treated and a water insoluble thermoplastic resin powder in water containing a water soluble anticorrosion agent, a surface active agent and a thickener, adhering said treatment solution to a surface of said metal to be treated, heating the surface of said metal to be treated to melt said thermoplastic resin powder and form a thermoplastic resin layer fixed on the surface of said metal to be treated, and forming a metal corrosion inhibiting layer on the surface of said metal to be treated, said metal powder being fixed in said thermoplastic resin layer.

4. A metal corrosion inhibiting method in accordance with claim 3, wherein said metal to be treated comprises iron or iron alloy and said metal powder comprises zinc powder. aluminum powder or zinc-aluminum alloy powder.

5. A metal corrosion inhibiting method comprising:
    preparing a treatment solution by dispersing at least one metal powder having a greater ionization tendency than that of a metal to be treated and a water insoluble thermoplastic resin powder in water containing a water soluble anticorrosion agent, a surface active agent and a thickener, adhering said treatment solution to a surface of said metal to be treated, heating the surface of said metal to be treated to melt said thermoplastic resin powder and form a thermoplastic resin layer fixed on the surface of said metal to be treated, and forming a metal corrosion inhibiting layer on the surface of said metal to be treated, said metal powder being fixed in said thermoplastic resin layer, and further treating with a mixture of polymer and/or oligomer and $Na_2O:nSiO_2$ (n=3 or 4) as a self-restoring agent for the self-sacrifice corrosion inhibiting property of said metal corrosion inhibiting layer, wherein said polymer(s) and/or oligomer(s) is(are) selected from the group consisting of poly (meth)acrylic acid; a copolymer in which (meth)acrylic acid is copolymerized with at least one kind of vinyl monomer; (meth)acrylic acid oligomer; and an oligomer in which (meth)acrylic acid is copolymerized with at least one kind of vinyl monomer.

* * * * *